United States Patent

[11] 3,578,262

[72] Inventor George C. Mandell
Des Plaines, Ill.
[21] Appl. No. 875,208
[22] Filed Nov. 10, 1969
[45] Patented May 11, 1971
[73] Assignee Ampex Corporation

[54] CASSETTE CHANGER WITH FAST TAPE WIND
7 Claims, 8 Drawing Figs.

[52] U.S. Cl. .......... 242/199, 274/11
[51] Int. Cl. .......... G03b 1/04, G11b 15/32, G11b 23/04
[50] Field of Search .......... 242/198—201; 274/4, 11

[56] References Cited

UNITED STATES PATENTS

| | | | |
|---|---|---|---|
| 2,755,030 | 7/1956 | D'Ornellas .......... | 242/55 |
| 3,289,962 | 12/1966 | Gillenthin, Jr. .......... | 242/198X |
| 3,326,483 | 6/1967 | Ivans .......... | 242/199 |
| 3,381,910 | 5/1968 | Fundingsland .......... | 242/198X |
| 3,385,534 | 5/1968 | Staar .......... | 242/198 |
| 3,429,519 | 2/1969 | Staar .......... | 242/198 |
| 3,433,428 | 3/1969 | Schatteman .......... | 242/198X |

FOREIGN PATENTS

| | | | |
|---|---|---|---|
| 1,181,423 | 2/1970 | Great Britain .......... | |

*Primary Examiner*—Leonard D. Christian
*Attorneys*—Anderson, Luedeka, Fitch, Even and Tabin and Robert G. Clay

ABSTRACT: A cassette changer is provided with a tape drive system a portion of which is disabled, preferably whenever the cassette changer shifts to a pause position to space tape drive components and a sound transducer head from the tape, to permit the tape to be driven in either a forward or reverse direction at a speed faster than the operational speed.

Patented May 11, 1971 3,578,262

4 Sheets-Sheet 1

INVENTOR
George C. Mandell

Anderson, Luedeka, Fitch, Even & Tabin ATTYS.

INVENTOR
George C. Mandell

Patented May 11, 1971 3,578,262

4 Sheets-Sheet 3

INVENTOR
*George C. Mandell*

INVENTOR
George C. Mandell

Anderson, Luedeka, Fitch, Even & Tabin ATTYS.

CASSETTE CHANGER WITH FAST TAPE WIND

This invention relates generally to a tape cassette changer apparatus of the kind which automatically transfers cassettes stored in a magazine to an operative position within the changer for playback from or for recording onto a tape stored in a cassette and, more particularly, to providing a high-speed tape transport for such cassette changers.

With tape cassettes it is particularly advantageous to provide the operator with the option of being able to skip a portion of a tape by causing the same to feed at a speed much faster than the operational speed for playback or recording. Also, where suitable controls are provided for rewinding the tape cartridges automatically, it is again advantageous that the regrinding operation also take place at a speed which is much faster than that of normal playback or tape recording operation. Additionally, where the tapes in the cassettes are fed forwardly for one side or track and fed reversely for the other side or track, it is particularly advantageous that a fast wind of tape be available in either the forward or reverse direction upon operation of a suitable control.

To be commercially acceptable, the fast wind mechanism for cassette changers must meet the demanding criteria of being relatively simple and inexpensive and noninterferring with the accurate location of a tape cassette and the sound systems and tape drives during normal playback or recording operations.

Accordingly, an object of the invention is to provide a cassette changer of the foregoing kind with high-speed forward or reverse tape wind capability.

Other objects and advantages of the invention will become apparent from the detailed description taken in connection with the accompanying drawings in which.

Figures 3, 4:
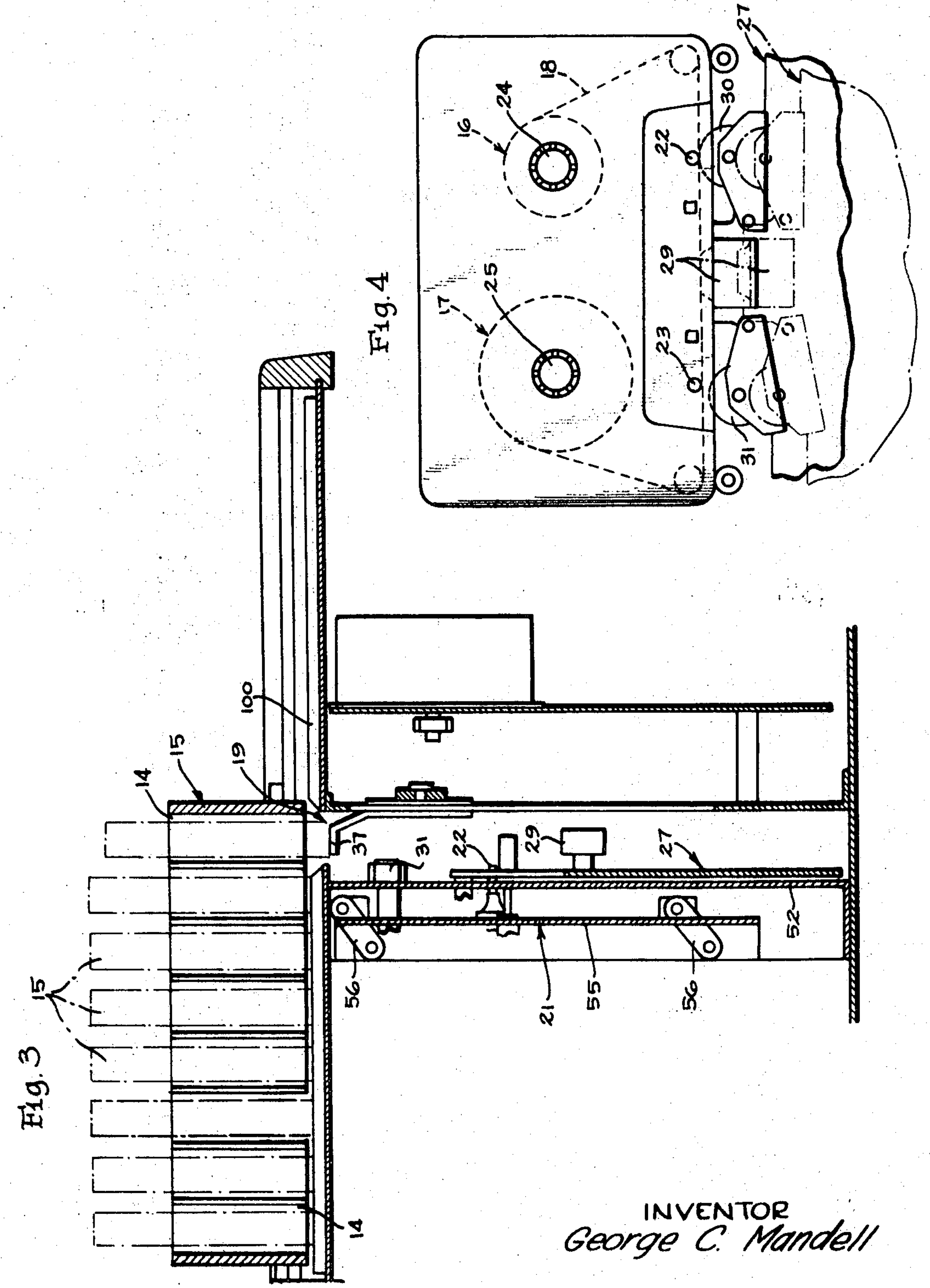
Figure 5:
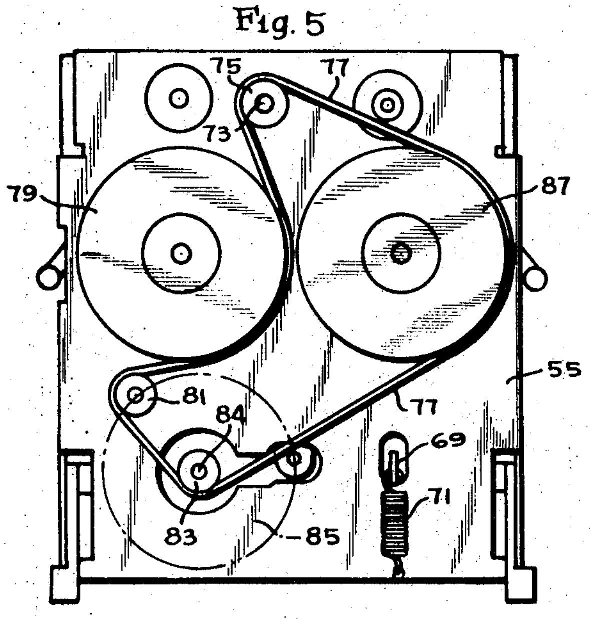
Figures 6, 7:
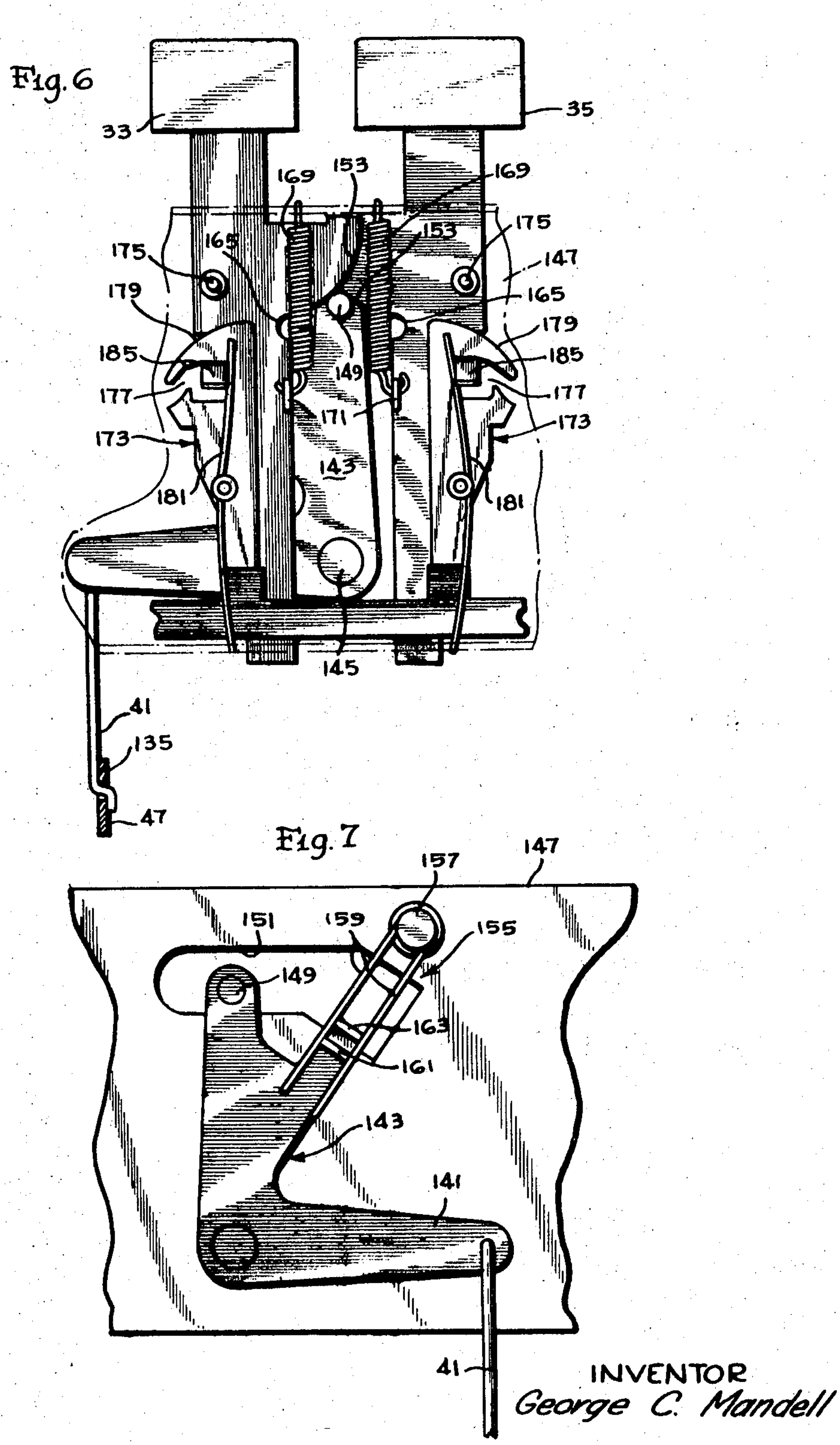

FOG. 3 is a partial, sectional view showing the cassette storing magazine and a cyclically operable means for transferring cassettes to and from the playback or recording station;

FIG. 4 is a diagrammatic view of a cassette and pause carrier having a sound transducer head and tape feed pinch rollers thereon;

FIG. 5 is a view illustrating a drive belt and flywheel assembly for driving the tape-feeding means;

FIG. 6 is a diagrammatic, illustrative view of pushbutton selectors for initiating a forward or reverse fast wind tape transport;

FIG. 7 is a rear view of a lever operated by the selectors shown in FIG. 6; and

Figure 8:
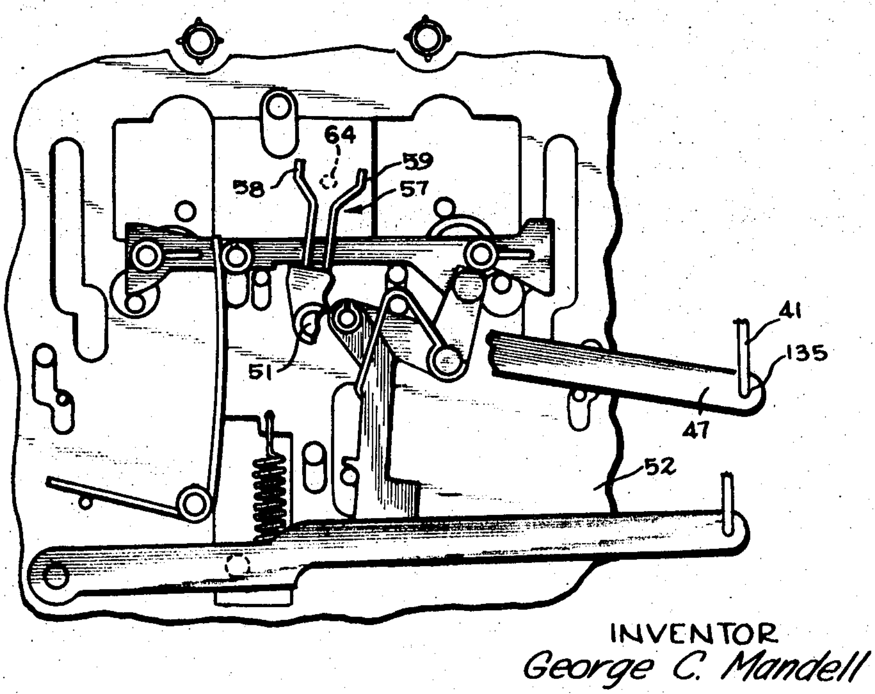

FIG. 8 is a diagrammatic, illustrative view of a fast wind lever.

As shown in the drawings for purposes of illustration, the invention is embodied in a cassette changer 11 having a magazine 13 in which are stored a series of cassettes 15 each having a first or a forward reel 16 (FIG. 4) and a second or reverse reel 17 with a tape 18 extending between the reels for winding from one to the other. Each cassette 15 is transferred from the magazine 13 through a transfer slot 19 (FIG. 3) to a movable chassis 21 which lowers the cassettes and simultaneously inserts a pair of capstans 22 and 23 and a pair of spindles 24 and 25 into the respective reels 16 and 17. Within the cassette changer is a pause carrier 27 on which are mounted a sound transducer head 29 and a pair of pinch rollers 30 and 31, each of the latter being positionable to cooperate with an associated capstan to feed the tape 18 at low speed in a given direction. The pause carrier 27 is shiftable relative to the cassette between a pause position, as illustrated in phantom lines in FIG. 4, which is its normal position with the pinch rollers and transducer head spaced from engagement with the tape and an operating position illustrated in solid lines in FIG. 4, in which the transducer head engages the tape and the tape is gripped at a nip between a pinch roller and tape capstan.

A fast wind operation is initiated by operation of a selector in the form of either a forward fast wind pushbutton 33 for causing a high-speed forward movement of the tape causing it to be wound on the reel 17 or a reverse, fast wind pushbutton 35 for causing the tape to be wound on the reverse reel 16. The fast wind pushbuttons 33 and 35 are interlocked with a play/record pushbutton 37 so that immediately upon operation of one of the fast wind pushbuttons, the play/record operation at the lower speed is terminated and the pinch rollers 30 and 31 and transducer head 29 are shifted from the tape into the "pause " or standby mode prior to initiation of the high-speed winding operation. If the machine is already in the pause, standby mode, the depression of a fast wind pushbutton results in an immediate fast wind tape-feeding operation. As will be explained in greater detail, the operation of either one of the fast wind pushbuttons results in the disabling of the drive for capstans 22 and 23 so that they may turn freely at the fast tape transport speed and the positioning of a high-speed power roll 39 into driving relationship with either the tape reel 16 and 17 for driving one of them at a high-speed. A fast wind operation terminates when the tape is completely wound on a reel or the operated pushbutton is returned to its unoperated position.

Each of the fast wind pushbuttons 33 and 35 operates means to shift the power roll 39 and this means includes a vertically extending link 41, as best seen in FIG. 8, which extends downwardly and is pivotally connected at its lower end to a fast wind lever 47. The fast wind lever 47 is disposed generally horizontally and is pivoted on an outwardly, horizontally projecting pivot pin 51 fixed to a vertical stationary frame plate 52 on which is mounted the pause carrier 27, as best seen in FIG. 3. The fast wind lever is movable from a central idle or inoperative position in which the power roll 39 is not effective to an upper forward position in which the power roll 39 is shifted to drive the forward reel 16 or to a lower reverse position in which the power roll 39 is shifted to drive the reverse reel 17. As will be explained, the power roll 39 is carried on the upper end of a rocker arm or lever 53 carried on the outer side of movable chassis plate 55 of the movable chassis 21. The movable chassis plate 55 is mounted by a parallelogram linkage including four links 56 (FIG. 3) to simultaneously lower the cassette as the chassis plate moves toward the plane of the stationary frame plate 52 carrying the fast wind lever.

To provide a yieldable interconnection between the fast wind lever 49 and the rocker arm 53, the fast wind lever 47 carries a forked spring 57 having upper widely spaced ends 58 and 59 into the fork of which projects a pointed pin 64 (FIG. 2) fastened to the rocker arm 53 when the chassis plate 55 carrying the rocker arm 53 moves closely adjacent the stationary frame plate supporting the fast wind lever 47. Thus, the pointed pin 64 may be inserted and centered between the spring ends 58 and 59 and be engaged and turned by them to pivot rocker arm 53 and thereby swing the power roll 39 from its idle position, The forked spring ends 58 and 59 provide a nonpositive and only a limited amount of force for urging the power roll 39 into engagement with one of the reels, and this prevents generation of excessive lateral forces by the power roll which could not be overcome and which would result in a failure to achieve a high-speed tape transport, as will be explained.

Figure 1:
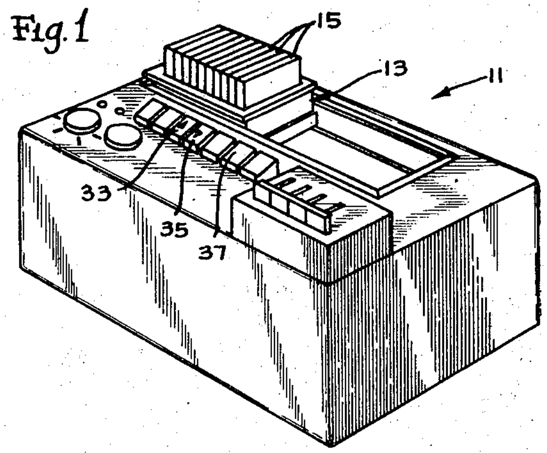
FIG. 1 is a perspective view of a cassette changer apparatus embodying the invention.
Figure 2:
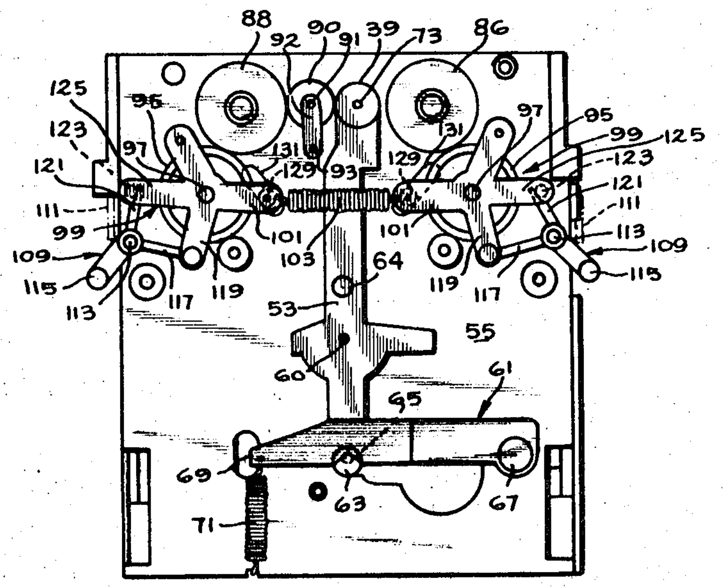
FIG. 2 is a view of means for causing a fast wind and tape transport in either a forward or reverse direction.

The rocker arm 53 for the power roll 39 is pivoted on a stud 60 fixed to the movable chassis plate 55 and is centered in the idle, nondriving position by a centering means which includes a spring-biased centering lever 61. More specifically, the rocker arm is connected to the centering lever at the lower portion thereof which carriers a turnable eccentric stud 63 which projects into a downwardly extending V-shaped notch 65 in the centering lever 61. The preferred V-shaped notch 65 is formed in the lower edge of the centering lever 61 with walls disposed at 45° the vertical. The centering lever is pivotally mounted at one end on a pivot stud 67 fixed to the movable chassis plate 55 and its opposite end is bent to provide a laterally projecting hook 69 which project at right angles to the plate 55 and through an elongated slot therein. As best seen in FIG. 2, the projecting hook 69 of the centering lever 61 is attached to the upper end of a vertically disposed contractile spring 71 which is hooked at its lower end to the movable chassis plate 55. The spring 71 is of sufficient strength to center the rocker arm 53 but yields readily when the forked spring 57 pivots the pin 64 on the rocker arm. Upon release of the fast wind lever, the centering spring 71 returns the power roll 39 and rocker arm 53 to the centered, nondriving idle position. This idle position is maintained and precisely located by turning the eccentric stud 63 relative to the V-shaped groove in the centering lever 61 which thereby pivots the rocker arm 53 to carry the power roll 39 to the desired adjusted idle position.

In its preferred form, the power roll 39 is fixed to one end of an axle 73 (FIG. 5) which projects into and is journaled in a bearing disposed within an elongated bearing housing fastened to the upper end of the rocker arm 53. The bearing housing projects rearwardly through a horizontally elongated opening in the movable chassis plate 55 for pivotal movement relative to the chassis plate with the rocker arm. The axle 73 carries at its other and opposite end an idler sheave 75 which is fixed to the axle to rotate it and the power roll 39 and which receives a power input from a drive belt 77.

From the idler sheave 75, the drive belt 77 extends downwardly along the lower inside quadrant of a first flywheel 79 fixed to the forward feed capstan 22 and about an idler roller 81 mounted for rotation on a shaft fixed to the plate 55 and then to the underside of a drive sheave 83 attached to a motor shaft 84 driven by an electric motor 85. The belt is driven by the motor and moves about a flywheel 87 fixed to the reverse tape feed capstan 23. As the motor 85 turns, the large-diameter flywheels and the capstans attached thereto rotate through significantly few revolutions per minute than does the sheave 75 for turning the axle 73 carrying the power roller 39.

The power roll 39 is a common plane with and closely adjacent to a first turntable 86, FIG. 2, to engage and drive the same in the direction to drive its spindle 24 and wind the tape on the cassette reel 16 driven by the spindle 24. A second left-hand turntable 88 is driven in a reverse direction from that of the first turntable 86 through a pivotally mounted idler wheel or roller 90 which also has a rubber-tired peripheral surface for frictionally engaging and drive the second turntable. More particularly, the idler is journaled for freely turning on an axle 91 carried by bifurcated ends of an idler arm 92 pivotally mounted at its lower end on a pivot pin 93 fixed to the chassis plate 55. When the power roll 39 is held in its idle position, the idler wheel may engage it but the opposite side of the idler wheel will be spaced from the second turntable. It is only when the rocker arm 53 swings the power roll toward the second turntable that the torque from the power roll is transmitted and there is a reverse directional rotation of the spindle 25 from that imparted to the other spindle 24.

Turning now to the feeding of the tape at conventional speeds during a playback or a recording operation during which the power roll 39 is in its idle position, one of the turntables is being driven at a slower speed by means of an intermediate roller 95 which is journaled on an axle 97 on a multiarmed carrier 99 mounted on the movable chassis plate 55. Each of the intermediate rollers 95 is disposed for shifting into engagement with a capstan 22 or 23 to be driven thereby and, in turn, to drive in its associated turntable. Inwardly directed arms 101 of the carrier 99 are connected to opposite ends of a spring 103 which pulls the carriers 99 toward each other and into driving relationship between a pair of capstans and the turntables.

To assure that the intermediate rollers 95 are thrown off from the turntables to allow them to travel at a speed faster than the speed of the capstans 22 and 23, throw off means are provided in the form of a pair of levers 109 which are adapted to be engaged and pivoted by winglike portions 111 of the pause carrier 27 as the latter moves to its pause position. If the pause carrier is already at the pause position, the pause carrier portions 111 will be holding the throwoff levers 109 in positions at which the intermediate rollers 95 are spaced from the turntables. The throwoff levers 109 are pivotally mounted on studs 113 fixed to the plate 55 adjacent the vertical sides thereof with a first arm 115 projecting beyond the side of the plate 55 into the path of movement of the winglike portions 111 of the pause carrier. A second arm 117 on each throwoff lever extends to and is pivotally connected to a downwardly extending arm 119 of its adjacent, intermediate roller carrier 99. A third arm 121 on each throwoff lever extends upwardly inwardly from its pivot stud 113 to abut the inner side of inwardly projecting pin 123 carried on an outwardly extending arm 125 of its intermediate roller carrier 99. Thus, the throwoff levers each have a pair of arms 117 and 121 connected to a pair of arms of an associated intermediate roller carrier to shift the same laterally from a turntable. To assist in guiding the carriers 99 outward movement each carrier has a guide pin 129 fixed to its inwardly projecting arm 101. The guide pins 129 are constrained to travel within a slot 131 in the chassis plate and in an upward and outward direction as caused by the throwoff lever arms 117 and 121. The slot 131 is also slightly curved to prevent binding between the pin and slot as the carrier moves out and up along an arcuate path. The pause carrier wing portions are returned to positions above the throwoff levers with movement of the pause carrier 27 to its operative position in which tape should be fed at the slower operational speed. When the pause carrier wing portions rise above and release the throwoff levers, the centering springs 103 pull the carriers 99 toward each other to engage the intermediate rollers 76 and 78 causing the arms 115 of the throw levers to extend beyond the sides of the plate to await the next shifting of the pause carrier 27 to the pause position.

It will be recalled that the operation of the fast wind lever by the forward and reverse pushbuttons 33 and 35 moves the line 41 vertically and swings the fast wind lever 47 from a central intermediate position to either an upper or lower position with a resultant swinging of the rocker arm 53 and the power roll 39 into driving relationship with one of the respective reels 16 and 17. As best seen in FIG. 8, the link 41 is hooked at its lower end in an aperture 135 in the fast wind lever and at its upper end to a generally horizontally extending arm 141 of a bellcrank 143 which is operated by the respective pushbuttons 33 and 35.

As will be explained, the pushbuttons 33 and 35 are so related to the bellcrank 143 that they pivot it in opposite directions to pull up or push down on the link 41 to cause either a forward or reverse fast wind tape transport. To these ends, the bellcrank 143 is pivotally mounted on a support post 145 fixed to a vertically extending bracket 147 in which are mounted the pushbuttons 33 and 35. A generally vertically extending arm for the bellcrank 143 is provided with a cam follower 149 in the form of a cylindrical pin which projects through an opening 151 in the control bracket 147 to a position intermediate a pair of generally curved cam surfaces 153 on the respective pushbuttons 33 and 35. As best seen in FIG. 6, depression of the pushbutton 33 causes its cam 153 to force the follower 149 to the right to pivot the bellcrank 143 clockwise causing the horizontally disposed arm 141 to pull upwardly on the link 41 and the fast wind lever 47 to pivot the latter to its upward position. On the other hand, a depression of the reverse feed pushbutton causes its cam 153 to pivot the cam follower and bellcrank 143 in the counterclockwise direction forcing the horizontal bellcrank arm 141 and attached link 41 down to pivot the fast wind lever downwardly to cause the power roller 39 to swing into position for reverse feeding. The bellcrank 143 is centered by a hairpin configured spring 155 which has a central coiled portion fixed to a pin 157 secured on the bracket 147 and a pair of generally straight legs 159 which extend along opposite sides of a central tab 161 on the bellcrank 143 positioned between the spring legs 159. Closely adjacent to the bellcrank tab 161 is a bent stop 163 formed by bending a portion of the stationary bracket 147. Thus, as the bellcrank pivots and flexes one of the spring legs 159 in the direction the bellcrank is turning, the opposite leg bears against the stop 163 so that the flexed leg will exert a returning force to the bellcrank when it is released by a pushbutton.

An interlock means is provided to assure that only one of the pushbuttons 33 or 35 is operated at a time. To this end, each of the pushbuttons 33 and 35 is provided with an arcuately shaped locking notch 165 which is located immediately beneath the cam surface 153 for receiving therein the cam follower pin 149 on the bellcrank 143. As the bellcrank is held against pivoting its cam follower pin 149 downwardly, the latter holds the pushbutton against downward movement. For example, the depression of the reverse feed pushbutton 35 causes the cam follower pin 149 to move into the locking notch 165 for the pushbutton 33 and prevents a downward movement of the pushbutton 33 until the cam follower pin is removed from the locking notch in the pushbutton 33.

As more fully disclosed in the aforesaid copending application, each of the fast wind pushbuttons 33 and 35 is mounted for sliding vertical movement within the bracket 147 and is biased upwardly by a return spring 169 which is hooked at its upper end to control bracket and hooked at its lower end to a bent tab 171 on a pushbutton. The push buttons are held or latched in a depressed, actuated position by a pawl-shaped lever 173 which receives and holds a roller 175 on the pushbutton when the latter is inserted into a notch 177 in the pawl lever 173. More particularly, depression of a pushbutton, such as the pushbutton 33, causes its roller to abut an upper end of the pawl lever having an arcuate cam surface 179 on the top thereof and the roller causes the pawl lever 173 to pivot against the urging of its return spring 181. The roller 175 continues to move down and to swing the pawl lever 173 until the roller is aligned with an opening or mouth leading into the notch 177 whereupon the return spring 181 swings the pawl lever to capture the roller in the notch 177 and hole the same in a depressed position against the upward pull of the pushbutton return spring 169.

The release of a pushbutton is accomplished by a further slight downward movement of the pushbutton which causes the roller 175 to abut an inclined cam portion 185 on the pawl lever to force the same to pivot outward from and in a plane at right angles to the longitudinal dimension of the pushbutton. Thus, the pushbutton is no longer within the plane of the pawl lever and the pushbutton is free to rise upwardly with the roller 175 moving past and over the pawl lever 173 under the urging of the pushbutton return spring 169.

As an aid to the understanding of the invention, a brief description of the operation will be now given. At any time during a playing or recording operation, either one of the forward or reverse pushbuttons 33 or 35 may be depressed to cause immediate commencement of a tape transport at a speed faster than the usual operational speed. Assuming that the forward pushbutton 33 is depressed, its cam 153 (FIG. 6) abuts the cam follower 149 and pivots the bellcrank 143 to lift the vertically extending link 41 to pivot the fast wind lever 47 upwardly from its intermediate position. The fast wind lever carries spring leg 59 against the pin 64 on the rocker arm 53 to pivot the rocker arm about its central pivot post 60 to cause the power roller 39 to swing against the idler 90 which is in driving contact with the turntable 88 on which is the spindle 25 which is in driving relationship with the cassette reel 17. The turntable 88 is free to turn independently of the adjacent intermediate roller 95 as the latter was shifted out of engagement by the wings 111 on the pause carrier plate abutting and swinging the throwoff levers 109.

From the foregoing, it will be seen that a high-speed tape transport is a available in either direction merely upon actuation of a suitable manually operable selector. As the mechanisms for providing the fast tape wind are relatively simple and low cost to manufacture, the fast wind mechanism is a commercially acceptable one.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. In an apparatus for playing or recording on each of a series of tape cassettes having a pair of reels therein between which tape is wound and unwound, the combination comprising: a magazine for storing a series of cassettes and for positioning each of the cassettes at a transfer station for movement to an operating station, a shiftable chassis for transferring a cassette from said transfer station to said operating station, a forward and reverse drive spindle carried by said chassis for penetration into driving relationship with the respective reels of said cassette, a transducer head for engaging the tape in said cassette at said operating position, means including at least one capstan for engaging the tape and operable to feed the tape in a forward or reverse direction past said transducer head at a predetermined operational speed, means for pressing said tape against said capstan to cause said capstan to feed said tape at said operational speed, means for disabling said capstan feeding of said tape to permit said tape to travel at a faster speed, and a selectively operable drive means movable to a first position to drive said forward spindle to wind said tape in a forward direction at a speed faster than said operational speed and to a second position to drive said reverse spindle to wind tape in a reverse direction at a speed faster than said operational speed.

2. An apparatus in accordance with claim 1 in which said selectively operable drive means includes a power roll movable from an idle position in which the power roll is inoperative to drive a tape reel to said first and second positions for driving the respective spindles.

3. An apparatus in accordance with claim 2 in which said selectively operable drive means for driving said spindles at high speeds includes a pivotally mounted member carrying said power roll for pivoting the same in opposite directions from an intermediate idle position and in which means yieldably holds said pivoted member in said idle position.

4. An apparatus in accordance with claim 3 in which said selectively operable drive means includes a manually operated, forward selector and a manually operated, reverse selector and means interlocking said selectors to provide mutually exclusive operations thereof to cause either a fast wind in the forward direction or a fast wind in the reverse direction.

5. An apparatus in accordance with claim 1 in which said means for pressing the tape includes forward and reverse feed pinch rollers and in which said means to disable said capstan feeding includes a pause carrier for carrying said pinch rollers and said transducer head to a position spaced from said tape to permit high-speed tape transport.

6. An apparatus in accordance with claim 1 in which an intermediate drive means is disposed between the capstans and the spindles to drive the latter at said operational speed and in which said disabling means includes actuator means for disabling said intermediate drive means from driving of said spindles to permit the same to be driven at said faster speed.

7. An apparatus in accordance with claim 6 in which said disabling means includes a pause carrier for carrying said pressure means and transducer head to an inoperative position spaced from said tape and in which means on said pause carrier operates said actuator means to disable said intermediate drive means from driving said spindles.